(12) United States Patent
Hiraguchi

(10) Patent No.: US 7,032,853 B2
(45) Date of Patent: Apr. 25, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/897,092

(22) Filed: Jul. 23, 2004

(65) Prior Publication Data

US 2005/0029379 A1 Feb. 10, 2005

(30) Foreign Application Priority Data

Aug. 4, 2003 (JP) .............................. 2003-285700

(51) Int. Cl.
G03B 23/04 (2006.01)

(52) U.S. Cl. .................... 242/340; 242/338.1; 242/348; 360/85; 360/93; 360/132

(58) Field of Classification Search ................ 242/340, 242/342, 348, 345.2, 611, 611.1, 356; 360/132, 360/85, 93
See application file for complete search history.

(56) References Cited

U.S. PATENT DOCUMENTS

| | | | | |
|---|---|---|---|---|
| 5,183,219 A | * | 2/1993 | Abeille et al. | 242/340 |
| 5,826,811 A | * | 10/1998 | Melbye et al. | |
| 5,893,527 A | * | 4/1999 | Mizutani et al. | 242/348 |
| 6,038,112 A | * | 3/2000 | Kletzl | 360/132 |
| 6,273,352 B1 | | 8/2001 | Johnson et al. | |
| 6,817,562 B1 | * | 11/2004 | Evanoff et al. | 242/340 |
| 6,869,037 B1 | * | 3/2005 | Hiraguchi | 242/348 |
| 2003/0173440 A1 | * | 9/2003 | Hiraguchi | 242/348 |
| 2004/0089755 A1 | * | 5/2004 | Evanoff et al. | 242/340 |

* cited by examiner

*Primary Examiner*—William A. Rivera
(74) *Attorney, Agent, or Firm*—Sughrue Mion, PLLC

(57) ABSTRACT

In a recording tape cartridge, at a reel which is accommodated within a case, a magnetic tape is wound around an outer peripheral portion of a reel hub, and a reel gear is provided coaxially and annularly at an end surface of the reel hub. An annular convex portion projects coaxially from the end surface of the reel hub. An end surface of the annular convex portion is a reference surface which is orthogonal to an axis of the reel. When the magnetic tape is used, the reference surface abuts a positioning surface of a drive device, the reel is positioned in an axial direction, and the reel rises up within the case. The reel rotates around the axis due to driving force of a driving gear which meshes with the reel gear.

22 Claims, 13 Drawing Sheets

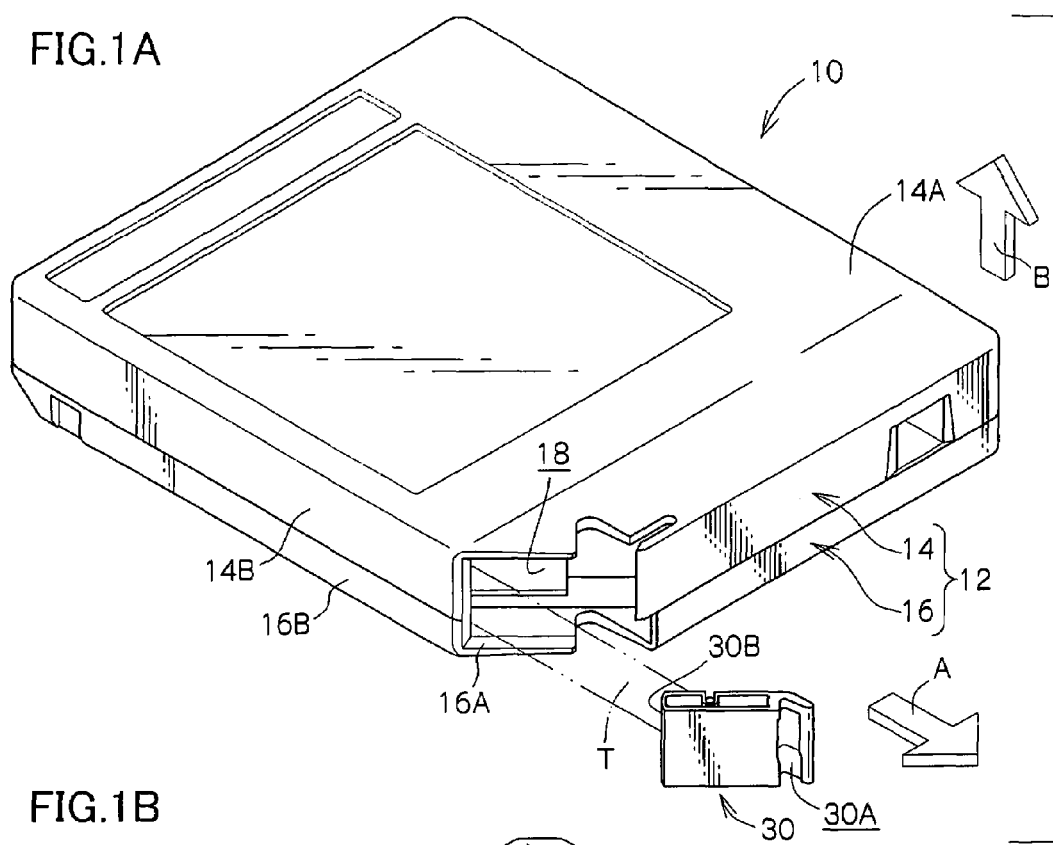
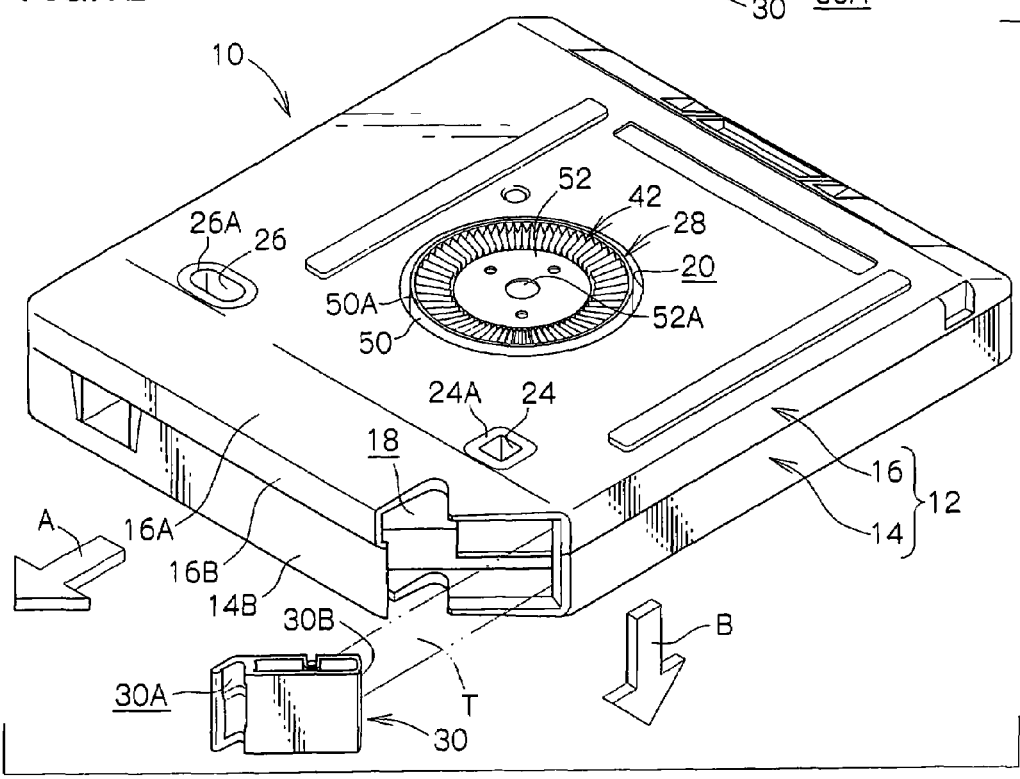

RECORDING TAPE CARTRIDGE

CROSS-REFERENCE TO RELATED APPLICATION

This application claims priority under 35 USC 119 from Japanese Patent Application No. 2003-285700, the disclosure of which is incorporated by reference herein.

BACKGROUND OF THE INVENTION

1. Field of the Invention

The present invention relates to a recording tape cartridge which rotatably accommodates, within a case, a reel around which a recording tape, such as a magnetic tape or the like, is wound.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which such recording tape is wound, is rotatably accommodated within a case.

In such a recording tape cartridge, a reel gear is provided in an annular form at an end surface of the hub of the reel around which the recording tape is wound. The reel gear is exposed from a gear opening of the case so as to be able to mesh with a driving gear of a drive device. When the recording tape is pulled-out from the case and used, the reel is positioned in the axial direction and rises up within the case, in a state in which the reel gear is meshed together with the driving gear. Driving force is transmitted to the reel due to the rotation of the driving gear, and the reel is driven to rotate.

The axial direction positioning of this reel is carried out by the meshing-together of the reel gear and the driving gear. Specifically, as shown in FIG. 13, the meshing surfaces of teeth 202 of a reel gear 200 and teeth 206 of a driving gear 204 are formed in taper shapes. The reel is positioned in the axial direction in a state in which the teeth 202 and the teeth 206 mesh together such that there is no backlash. Therefore, a reference plane D of the reel with respect to the axial direction within the drive device (i.e., when the reel is driven to rotate) is, for example, an imaginary plane which is the meshing pitch plane of the teeth 202 and the teeth 206. Further, the reel is driven to rotate in the rotating direction shown by the arrow R, in the state in which the teeth 202 and the teeth 206 are meshed together.

In such a recording tape cartridge, the dimensions of the respective portions are determined by using, as a reference, the reference plane D which is obtained by the reel gear 200 and the driving gear 204 meshing together. Therefore, high dimensional accuracy is required of the reel gear 200 and the driving gear 204. Further, because the reference plane D is formed in a state in which the large numbers of teeth 202 and 206 are meshing together, evaluation of the dimensional accuracy of the reel gear 200 and the driving gear 204 is difficult in spite of the fact that high accuracy is required of the reel gear 200 and the driving gear 204. Namely, for example, in a case such as when a given reel gear 200 and a given driving gear 204 do not mesh together correctly, it is difficult to ascertain whether the problem is at the reel gear 200 or the driving gear 204.

Thus, a structure has been considered in which a reference surface is provided at the hub end surface of the reel, separately from the reel gear, such that the reel gear does not participate in the reel positioning function. (See, for example, U.S. Pat. No. 6,273,352.) In this structure, three convex portions for reference project at uniform intervals in the circumferential direction from a portion, at an end surface of the hub, which portion is at a radial direction outer side of the reel gear which is formed in an annular form. The reel is positioned in the axial direction by reference surfaces, which are surfaces of the convex portions for reference which are orthogonal to the axis of the reel, being made to abut a positioning surface of a rotating shaft which has the driving gear at the drive device. In this way, by making surfaces which are orthogonal to the axis of the reel be the reference surfaces, control of the dimensions of the respective portions of the recording tape cartridge is easy. Note that, in this structure, the reel gear and the driving gear are structured so as to mesh together at taper surfaces in the same way as in the above-described structure. Backlash arises between the reel gear and the driving gear due to the positioning surface and the reference surfaces of the convex portions for reference abutting each other.

However, in this structure, there is room for improvement of the rigidity and the like of the convex portions for reference at the reel. Further, when attempts are made to make the backlash as small as possible, there is the concern that the reel gear and the driving gear will abut at the taper surfaces thereof before the reference surfaces and the positioning surface abut each other, and that the reel will not be positioned accurately in the axial direction.

Further, in the above-described respective structures, because the reel gear and the driving gear mesh together at taper surfaces, there is the concern that the torque of the driving gear will be converted, by the meshed-together surfaces, into thrust in the direction of making the reel gear and the driving gear move away from one another, and that the reel will joggle in the axial direction. If the reel joggles, the recording tape wound around the hub of the reel will be drawn-out or rewound while meandering, and therefore, recording or playback of the information of the recording tape will be adversely affected.

SUMMARY OF THE INVENTION

In view of the aforementioned, the present invention is to provide a recording tape cartridge in which positioning of a reel in the axial direction can be carried out reliably regardless of the meshing of a reel gear.

A recording tape cartridge of an aspect of the present invention has: a reel having a hub around whose outer peripheral portion a recording tape is wound, the reel being accommodated within a case; and a reel gear formed in an annular form which is coaxial with the reel, and provided at an end surface of the hub, and able to mesh with a driving gear of a drive device. When the recording tape is in use, the reel rotates around an axis due to driving force of the driving gear which meshes with the reel gear, in a state in which the reel is positioned in an axial direction and is raised up within the case. An annular convex portion projects coaxially from the end surface of the hub, and an end surface of the annular convex portion is a reference surface which abuts a positioning portion of the drive device and carries out positioning of the reel in the axial direction of the reel.

When the recording tape cartridge of the above-described aspect is loaded into a drive device when the recording tape is to be used, the reference surface provided at the hub of the reel abuts the positioning portion of the drive device, such that the reel is positioned in the axial direction. In this state, the reel gear of the reel meshes together with the driving gear of the drive device, and the reel rises up within the case and is able to rotate without contacting the case. When the driving gear rotates and driving force is transmitted to the reel gear, the reel rotates within the case, and the recording tape is used while being drawn-out or rewound.

Here, positioning is carried out by the reference surface, which is the end surface of the annular convex portion at the reel, abutting the positioning portion of the drive device. An imaginary plane determined by the meshing-together of the reel gear and the driving gear is not the reference plane as is the case in the conventional art. Management of the dimensions of the respective portions of the recording tape cartridge is easy. Further, the annular convex portion, at which the reference surface is formed, is formed in an annular form which is coaxial with the hub, and forms a closed cross-section. Therefore, as compared with a structure in which a plurality of convex portions are provided at uniform intervals in the circumferential direction, the rigidity is high, and it is difficult for the annular convex portion to deform due to abutment with the positioning portion. Therefore, reliability with respect to the accuracy of positioning by the reference surface is improved.

In this way, in the recording tape cartridge of the above-described aspect, axial direction positioning of the reel can be carried out reliably regardless of the meshing of the reel gear.

As described above, the recording tape cartridge according to the present invention has the excellent effect that axial direction positioning of a reel can be carried out reliably regardless of meshing of a reel gear.

BRIEF DESCRIPTION OF THE DRAWINGS

FIG. 1A is a view showing the exterior of a recording tape cartridge according to an embodiment of the present invention, and is a perspective view seen from above.

FIG. 1B is a view showing the exterior of the recording tape cartridge according to the embodiment of the present invention, and is a perspective view seen from below.

DETAILED DESCRIPTION OF THE INVENTION

A recording tape cartridge 10 according to an embodiment of the present invention will be described on the basis of FIGS. 1A through 10.

(Overall Structure of Recording Tape Cartridge)

Figure 2:
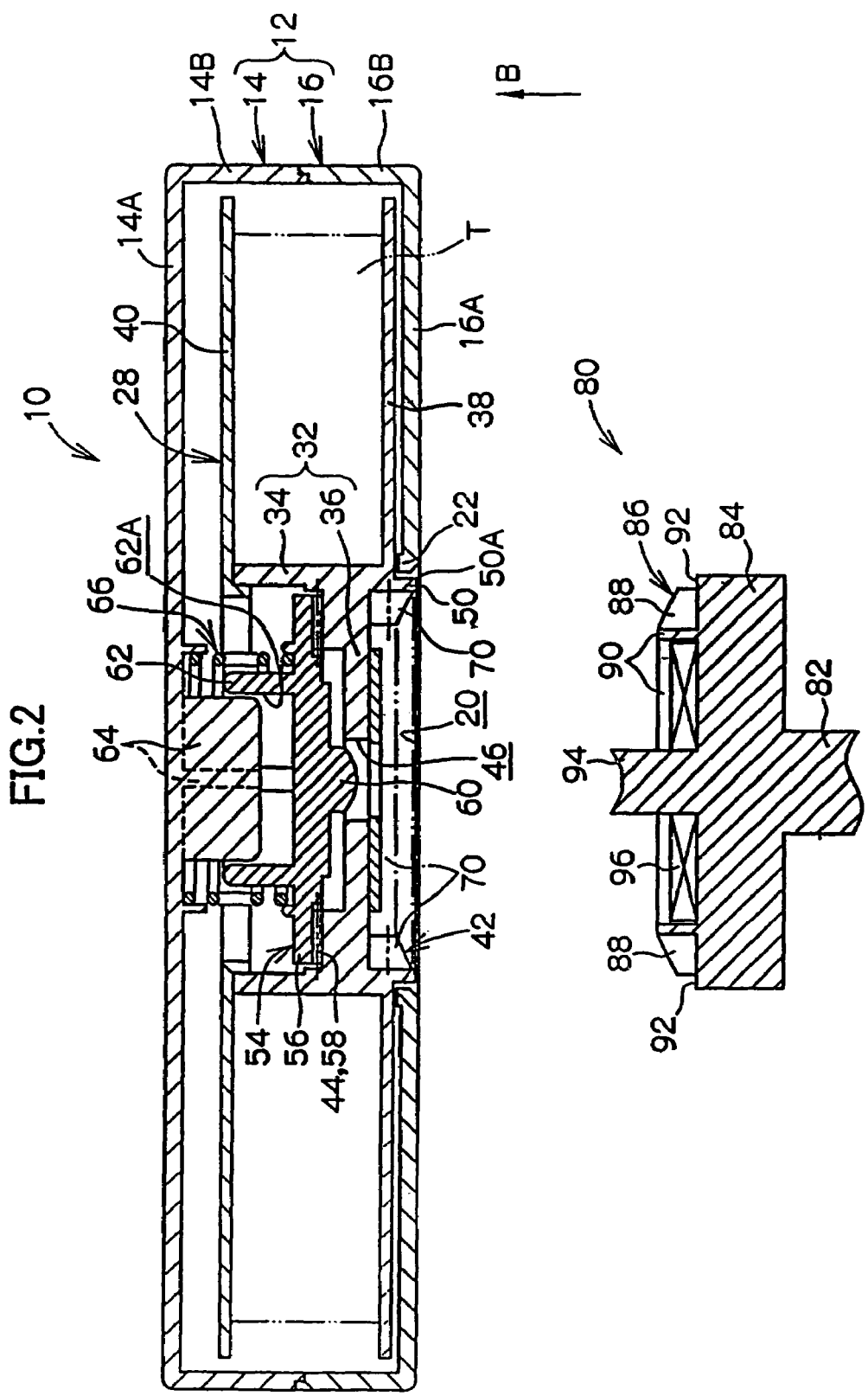
FIG. 2 is a sectional view at a time when a reel is not in use in the recording tape cartridge according to the embodiment of the present invention.

A perspective view, as seen from above and at an incline, of the recording tape cartridge 10 is shown in FIG. 1A. A perspective view, as seen from below and at an incline, of the recording tape cartridge 10 is shown in FIG. 1B. A sectional view of the recording tape cartridge 10 is shown in FIG. 2. Note that arrow A used appropriately in the respective drawings indicates the direction of loading the recording tape cartridge 10 into a drive device, and for convenience of explanation, the side in the direction of arrow A is the front side. Further, the direction indicated by arrow B is upward.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning of a reel 28 which will be described later.

A pair of positioning holes 24 and 26 are formed in a vicinity of the front end of the outer surface of the floor plate 16A of the case 12. The pair of positioning holes 24 and 26 are formed in the shapes of bags within projections (not illustrated) which stand erect from the floor plate 16A toward the interior of the case 12. The positioning holes 24 and 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24 and 26, the recording tape cartridge 10 is correctly positioned in the horizontal directions (the left/right direction and the front/back direction) within the drive device.

The portions of the floor plate 16A around the positioning holes 24 and 26 are positioning surfaces 24A and 26A which are finished so as to be smoother than the other portions of the floor plate 16A (the design surface of the floor plate 16A). When the positioning pins are inserted into the positioning holes 24 and 26, the positioning surfaces 24A and 26A abut positioning surfaces of the drive device which are provided around the positioning pins. In this way, the vertical direction positioning of the recording tape cartridge 10 within the drive device is carried out.

As shown in FIG. 2, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out device, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

(Structure of Reel and the Like)

Figure 3:
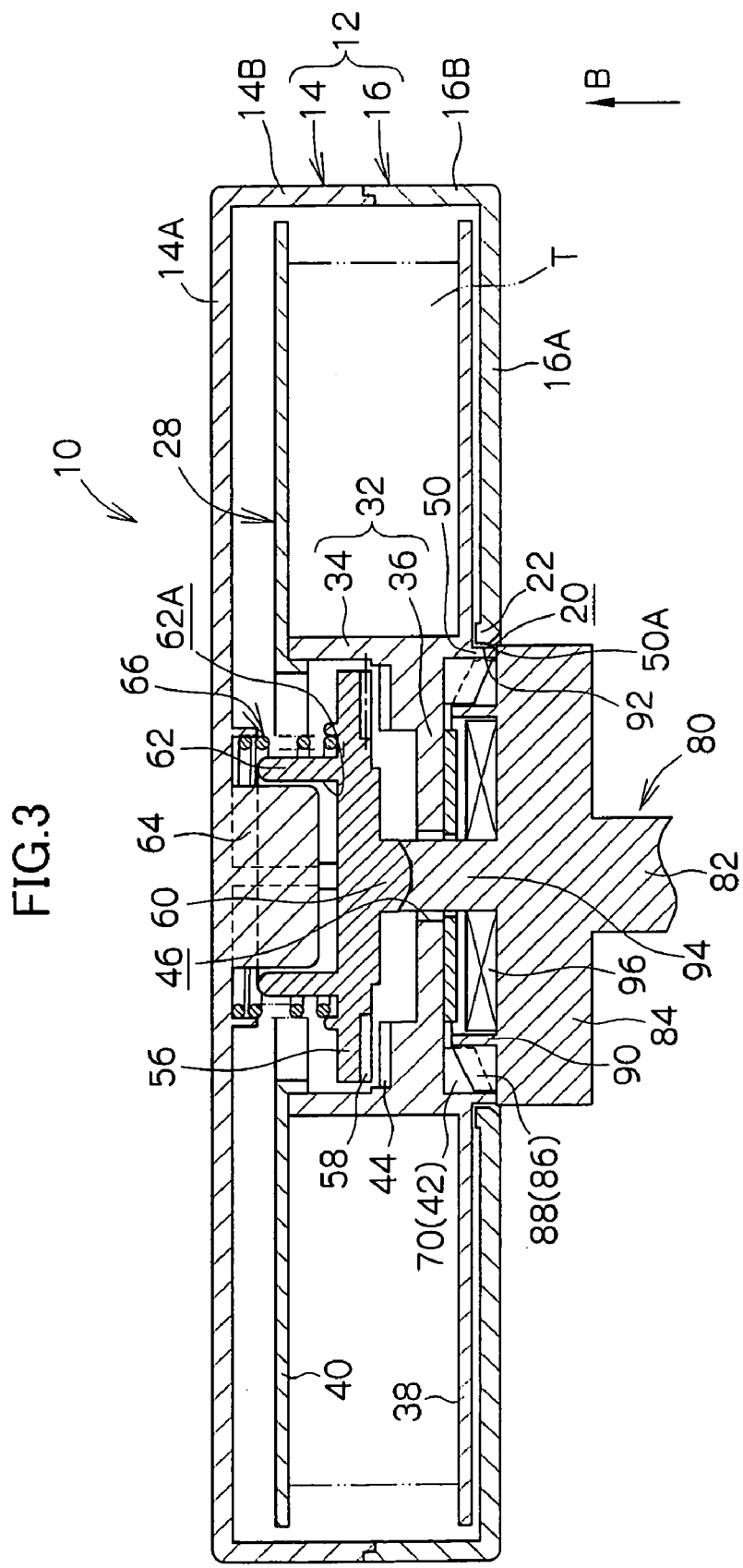
FIG. 3 is a sectional view in a state in which the reel can rotate in the recording tape cartridge according to the embodiment of the present invention.

Next, the reel 28 will be described. As shown in FIGS. 2 and 3, the reel 28 has a reel hub 32 which serves as a hub and which structures the axially central portion of the reel 28. The reel hub 32 is formed substantially in the shape of a hollow cylinder having a floor, and has a cylindrical portion 34 around whose outer peripheral surface the magnetic tape T is wound, and a floor portion 36 which closes the bottom portion of the cylindrical portion 34. A lower flange 38 extends coaxially and integrally at the radial direction outer side of the reel hub 32 from a vicinity of the floor portion 36 side end portion (i.e., the lower end portion) of the reel hub 32.

On the other hand, an upper flange 40, which is formed in correspondence with the lower flange 38, is joined to the upper end portion of the reel hub 32. In this way, at the reel 28, the magnetic tape T is wound around the outer peripheral surface of the cylindrical portion 34 of the reel hub 32, between the opposing surfaces of the lower flange 38 and the upper flange 40, and the cylindrical portion 34 is open toward the top.

Figure 4:
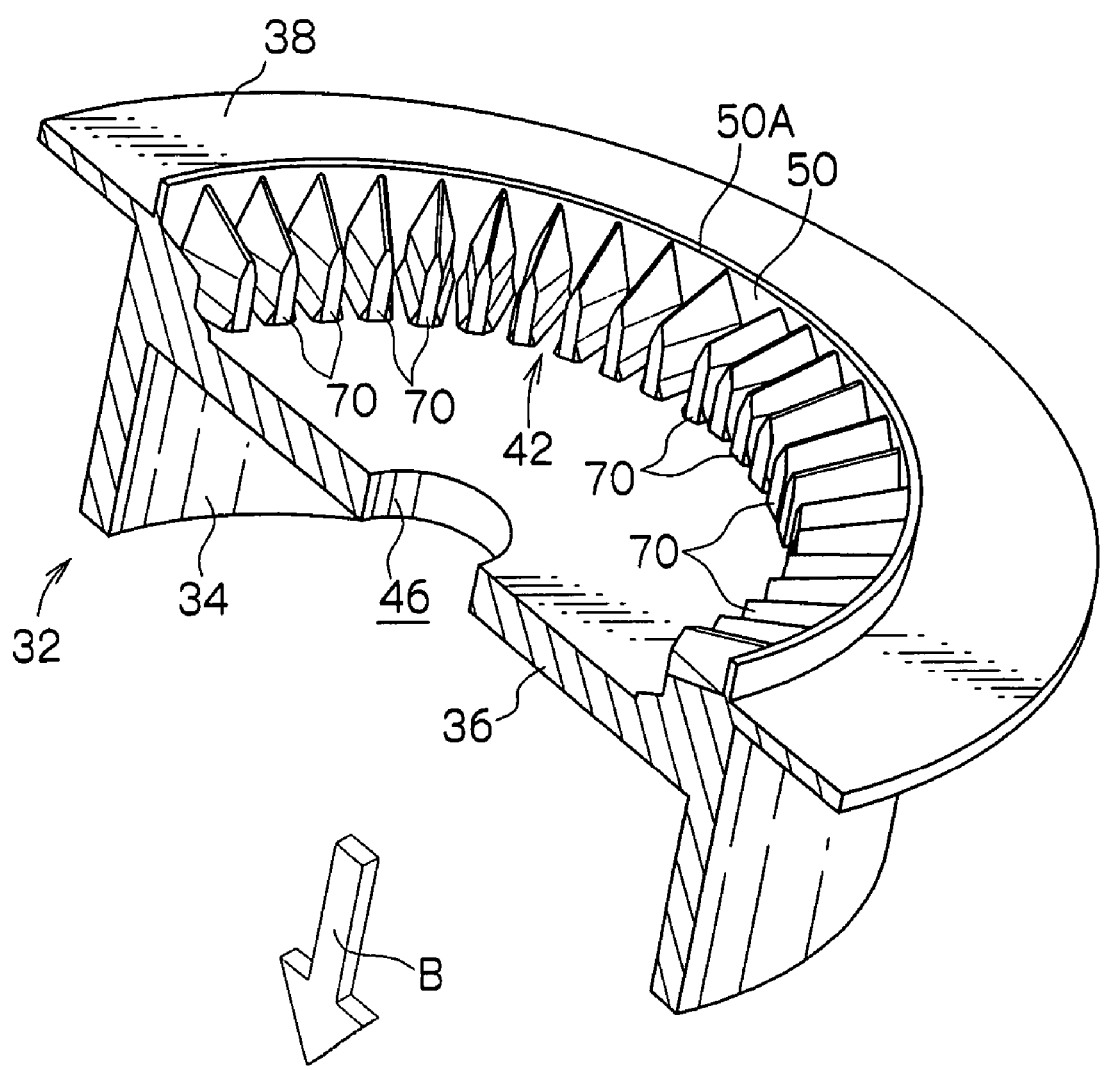
FIG. 4 is a perspective view as seen with a reel hub, which structures the recording tape cartridge according to the embodiment of the present invention, being cut.
Figure 5:
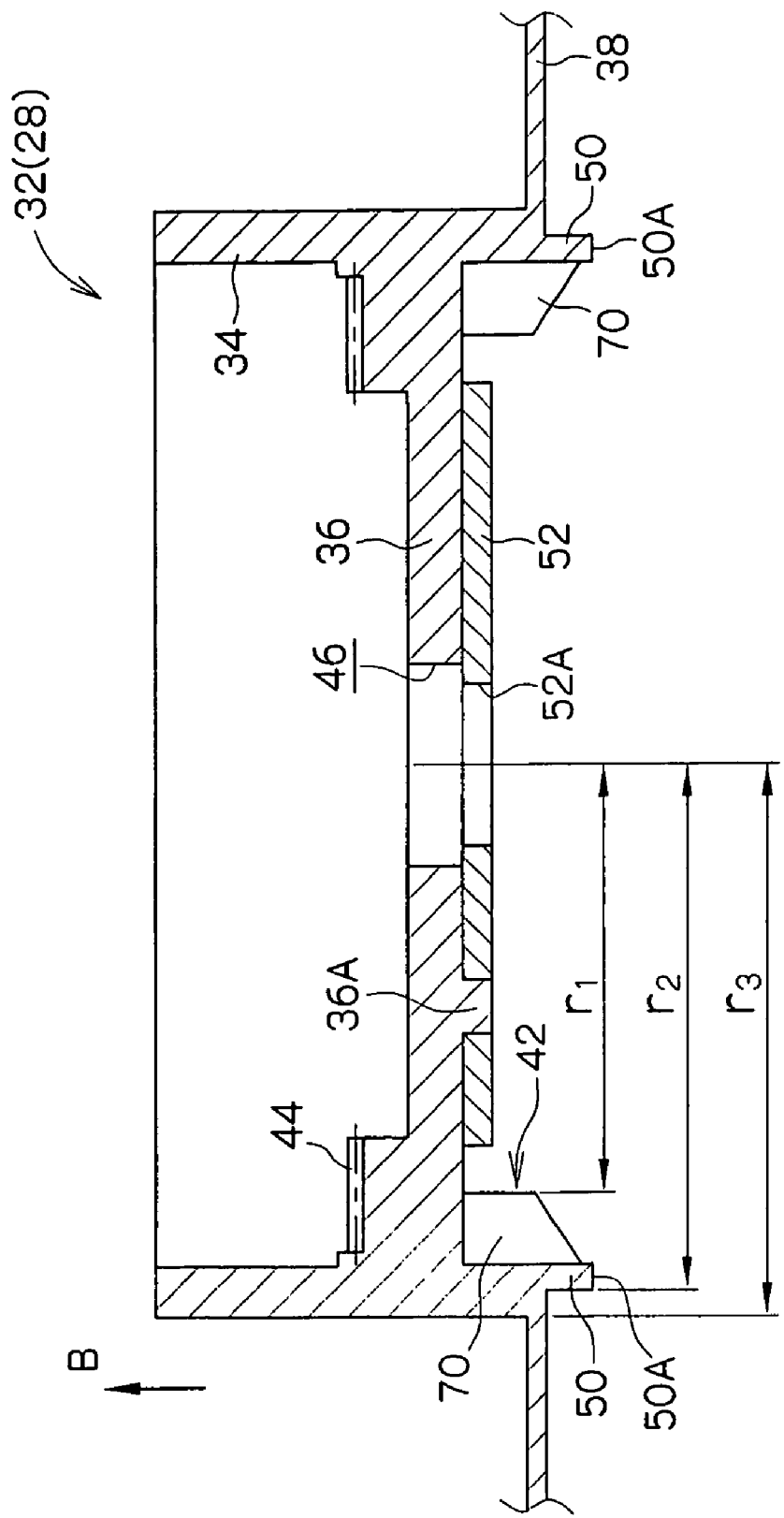
FIG. 5 is a sectional view of the reel hub which structures the recording tape cartridge according to the embodiment of the present invention.

As shown in FIGS. 4 and 5 as well, the reel gear 42 is formed on the whole in the shape of a ring which is coaxial with the reel 28, at the bottom end surface (the outer surface) of the floor portion 36 of the reel hub 32. The reel gear 42 can mesh with a driving gear 86 provided at the distal end of a rotating shaft 80 (to be described later) of a drive device. An annular convex portion 50 projects coaxially with the reel 28 from the bottom end surface of the floor portion 36. The end surface of the annular convex portion 50 is a reference surface 50A. The detailed structures of the reel gear 42 and the annular convex portion 50 will be described later.

Returning to FIGS. 2 and 3, an engaging gear 44, which is formed on the whole in the shape of a ring which is coaxial with the reel 28, is provided in a vicinity of the outer periphery of the top surface (the inner surface) of the floor portion 36 of the reel hub 32. The engaging gear 44 can mesh with a braking gear 58 of a braking member 54 which will be described later. Further, a pass-through hole 46, which passes through the axially central portion of the floor portion 36 along the direction of plate thickness thereof (the vertical direction), is formed in the floor portion 36. Note that illustration of the engaging gear 44 is omitted from FIGS. 4, 6, and 8.

The portions of the above-described reel 28, other than the upper flange 40, are formed integrally by resin molding. A reel plate 52, which is formed of a magnetic material, is provided integrally and coaxially by insert molding at the inner side of the reel gear 42 at the bottom surface of the floor portion 36 of the reel hub 32. The axially central portion of the reel plate 52 is a through hole 52A. The inner diameter of the through hole 52A is formed to be slightly smaller than the inner diameter of the pass-through hole 46.

The reel 28 is accommodated in the case 12, and when the recording tape cartridge 10 is not in use, the reel 28 is set on the annular rib 22. Specifically, the portion of the floor portion 36 at the outer side of the annular convex portion 50 (i.e., a vicinity of the inner edge of the lower flange 38) abuts the top end surface of the annular rib 22 (see FIG. 2). Movement of the reel 28 in the radial direction is restricted due to the annular convex portion 50 being set-in at the inner side of the annular rib 22.

In this state, the reel 28, on the whole, is positioned within the case 12, and the reel gear 42 and the reel plate 52 are exposed from the gear opening 20 (see FIG. 1B). Namely, the reel gear 42 faces the outside of the case 12 from the gear opening 20, without projecting out from the outer surface (the bottom surface) of the floor plate 16A. In this way, operation, i.e., chucking (holding) and driving/rotating, of the reel 28 from the exterior of the case 12 is possible.

When the recording tape cartridge 10 is not in use, rotation of the reel 28 with respect to the case 12 is impeded. Specifically, the braking member 54 is disposed so as to be inserted within the cylindrical portion 34 of the reel hub 32. The braking gear 58, which can mesh with the engaging gear 44, is provided at the braking member 54 at the outer peripheral portion of the bottom surface of a main body portion 56 which is substantially disc-shaped. A releasing projection 60 projects from the axially central portion of the bottom surface of the main body portion 56.

On the other hand, a cross-shaped projection 62 projects from the top surface of the main body portion 56. An engaging groove 62A, which is cross-shaped in plan view, is formed in the cross-shaped projection 62. A cross-shaped rib 64, which projects from the ceiling plate 14A, is inserted in the engaging groove 62A of the cross-shaped projection 62. In this way, the braking member 54 cannot rotate with respect to the case 12, but can slide in vertical directions while being guided by the cross-shaped rib 64. A compression coil spring 66 is disposed in a compressed state between the ceiling plate 14A and the top surface of the main body portion 56 of the braking member 54.

Due to the urging force of the compression coil spring 66, the braking member 54 is urged downward, and the braking gear 58 meshes with the engaging gear 44. Due to the meshing together of the braking gear 58 and the engaging gear 44, the reel 28 is in a locked state in which rotation thereof with respect to the case 12 is impeded. Further, the reel 28 abuts the annular rib 22 due to the urging force of the compression coil spring 66.

The state in which the reel 28 is locked by the braking member 54 is released due to the recording tape cartridge 10 being loaded into the drive device and the driving gear 86 of the rotating shaft 80 meshing with the reel gear 42.

The rotating shaft 80 is structured such that the driving gear 86 is formed in a coaxial ring shape on the top surface of a disc-shaped rotating table 84 which is provided at the distal end of a rotating shaft portion 82. The driving gear 86 is structured to have a plurality of teeth 88 in correspondence with the reel gear 42. The respective teeth 88 are reinforced by the radial direction inner end portions thereof being connected by a ring portion 90 which projects from the top surface of the rotating table 84.

A positioning surface 92, which the reference surface 50A of the reel 28 abuts, is formed at the radial direction outer side portion of the driving gear 86 at the top surface of the rotating table 84. A releasing/pushing portion 94, which can enter into the pass-through hole 46 and the through-hole 52A of the reel 28, projects from the axially central portion of the top surface of the rotating table 84. A magnet 96 is mounted between the releasing/pushing portion 94 and the driving gear 86. The magnet 96 attracts and holds the reel plate 52 of the reel 28 without contacting the reel plate 52.

When the releasing projection 60 is pushed by the releasing/pushing portion 94 and the braking member 54 is pushed upward as the reel gear 42 meshes together with the driving gear 86, the meshing together of the engaging gear 44 and the braking gear 58 is released, such that the reel 28 becomes able to rotate with respect to the case 12. The rotating shaft 80 approaches the case 12 in the axial direction up to a predetermined position, and the positioning surface 92 and the reference surface 50A of the reel 28 abut one another. In this state, the reel 28 rises up while positioned within the case 12, and moves away from the annular rib 22. In this way, as shown in FIG. 3, the reel 28 becomes able to rotate around the axis thereof without contacting the case 12.

(Structure of Reference Surface and Reel Gear)

As shown in FIGS. 4 and 5, the annular convex portion 50 is formed in the shape of a short, hollow cylinder, and projects coaxially from a vicinity of the outer periphery of the bottom end surface of the floor portion 36 of the reel hub 32. In the present embodiment, the reference surface 50A, which is the bottom end surface of the annular convex portion 50, is a flat surface which is orthogonal to the axis of the reel 28. Therefore, the positioning surface 92 of the rotating shaft 80, which the reference surface 50A partners with at the time of positioning, is formed as a flat surface which is orthogonal to the axis of the rotating shaft 80.

At the floor portion 36 of the reel hub 32, the portion at the radial direction inner side of the annular convex portion 50 is recessed further upwardly than the portion at the outer side (the portion connected to the lower flange 38). A plurality of teeth 70, which structure the reel gear 42 which is provided coaxially with the annular convex portion 50, are provided continuously with the inner surface of the annular convex portion 50 at the floor portion 36. Namely, the respective top ends of the teeth 70 are continuous with the floor portion 36, and the outer ends of the teeth, in the radial direction of the reel, are continuous with the annular convex portion 50. It is preferable that the number of teeth of the reel gear 42 is 45 or greater. In the present embodiment, the reel gear 42 has 60 teeth.

Figure 6:
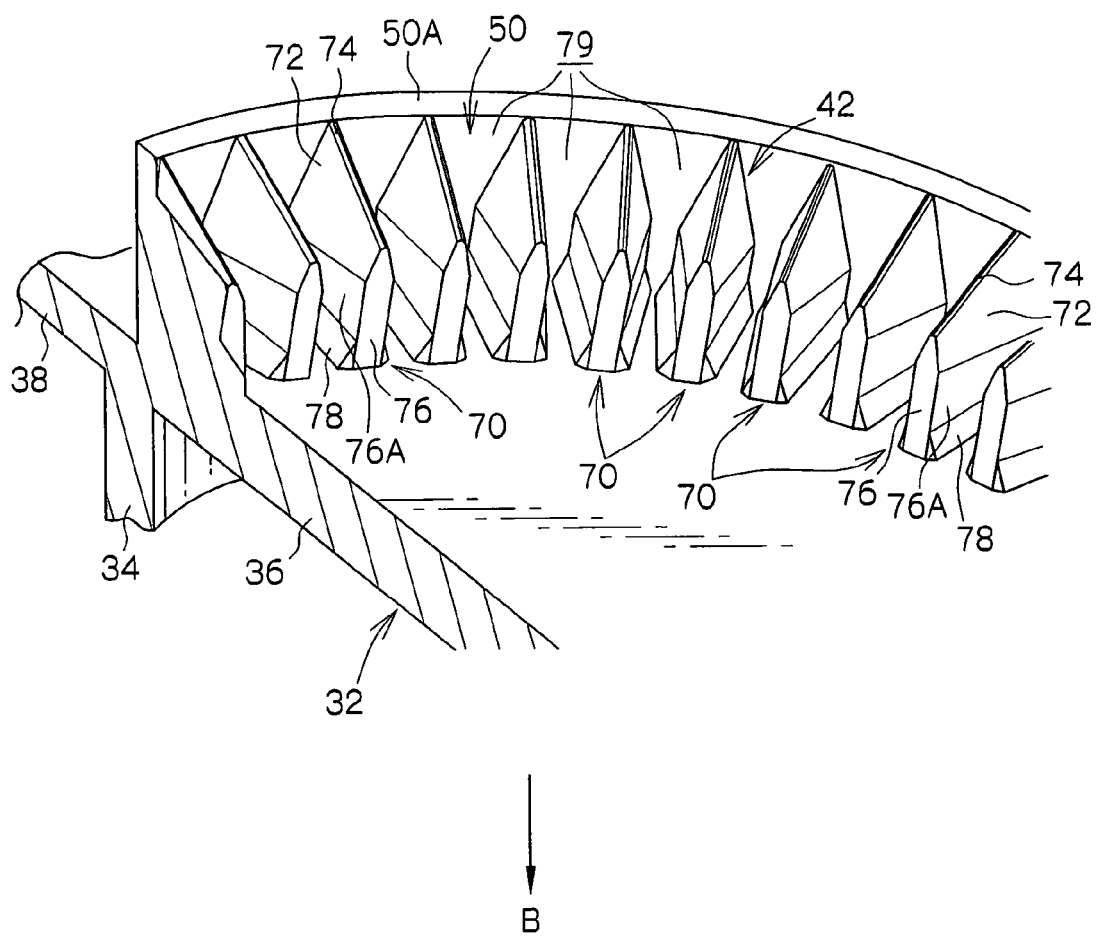
FIG. 6 is a perspective view showing teeth of a reel gear which structures the recording tape cartridge according to the embodiment of the present invention.

As shown in FIG. 6 as well, each of the teeth 70 is formed, in side view, in a substantially trapezoidal shape whose inner and outer ends in the reel radial direction are parallel, such that the tooth height (the height from the bottom end surface of the floor portion 36) continuously becomes smaller from the reel radial direction outer end of the tooth 70, which is continuous with the annular convex portion 50, toward the inner end, which is formed to have a predetermined tooth height. Further, each of the teeth 70 is formed, in plan view, in a taper shape in which the both sides are tapered, so as to become continuously thinner (narrower) from the reel radial direction outer end to the inner end which is formed to have the predetermined tooth height.

Figure 7:
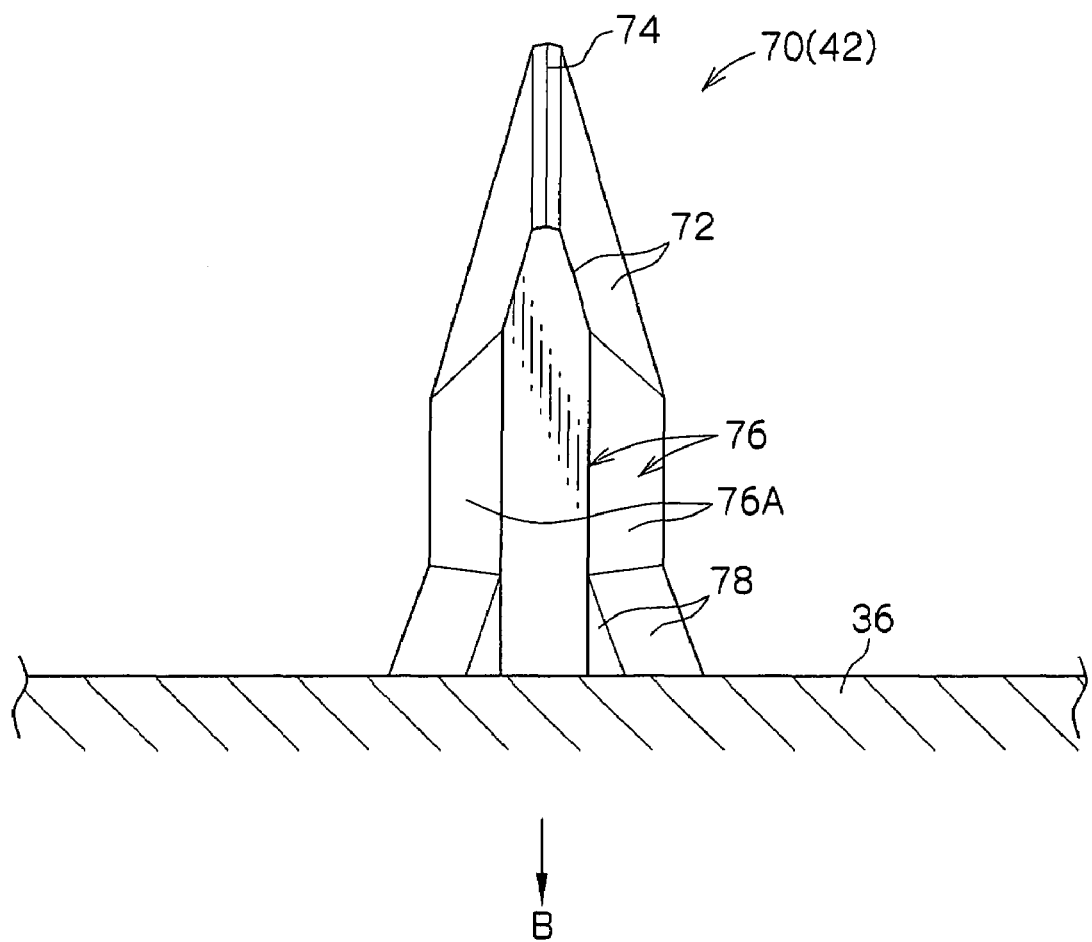
FIG. 7 is a front view showing the teeth of the reel gear which structures the recording tape cartridge according to the embodiment of the present invention.

Moreover, as shown in FIG. 7 as well, a tooth distal portion (tooth end) 72 of each of the teeth 70 is formed in a taper shape in which the both sides are tapered, with a tooth tip 74 being the peak portion. Further, a meshing portion 76 is continuous with the top side of the tooth distal portion 72. A root portion (tooth base) 78 which reaches the floor portion 36 is continuous with the top side of the meshing portion 76. The root portion 78 is formed in a taper shape in which the both sides are tapered, such that the tooth width continuously becomes wider from the border with the meshing portion 76 toward the border with the floor portion 36.

Figure 8:
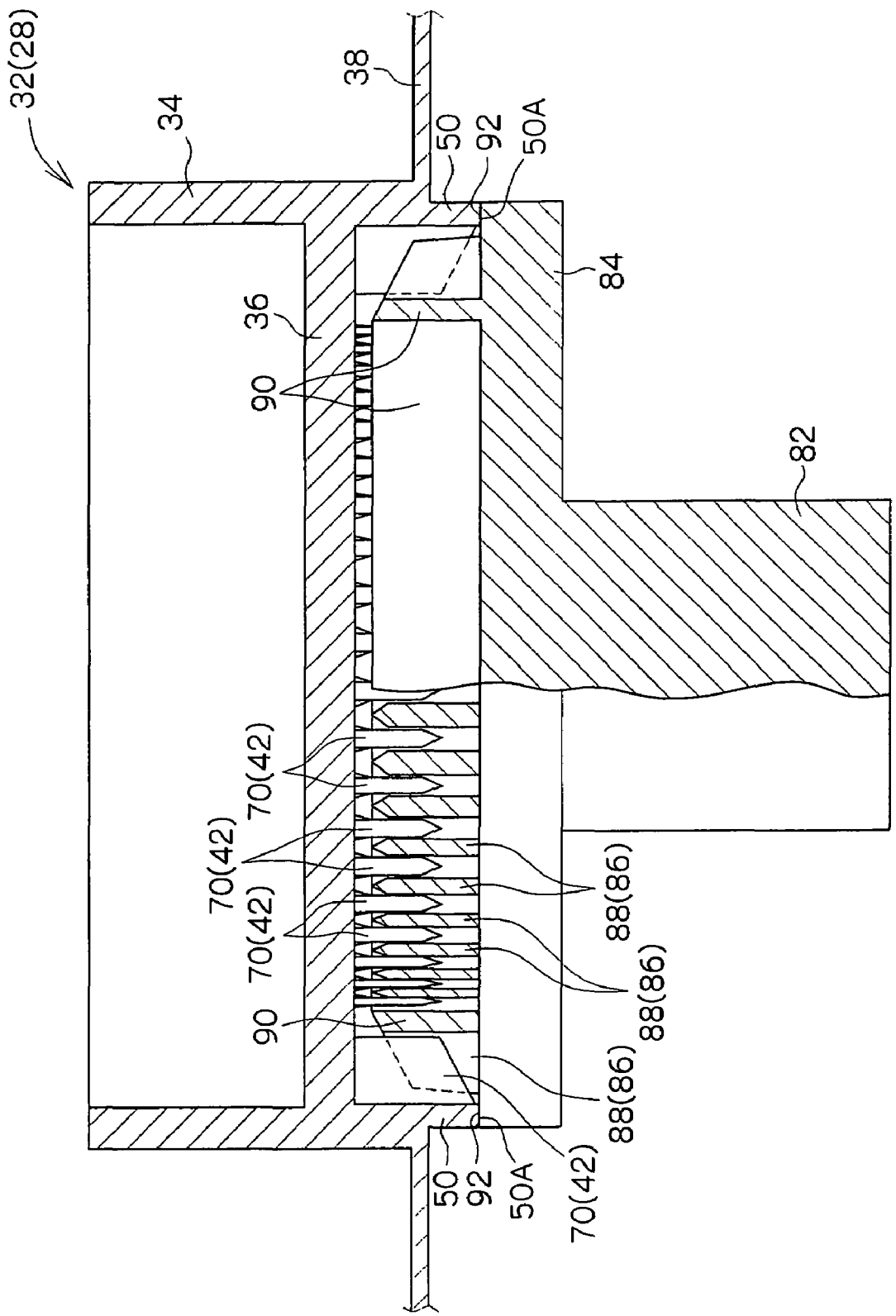
FIG. 8 is a sectional view showing a state in which the reel gear, which structures the recording tape cartridge according to the embodiment of the present invention, is meshed together with a driving gear of a drive device.
Figure 9:
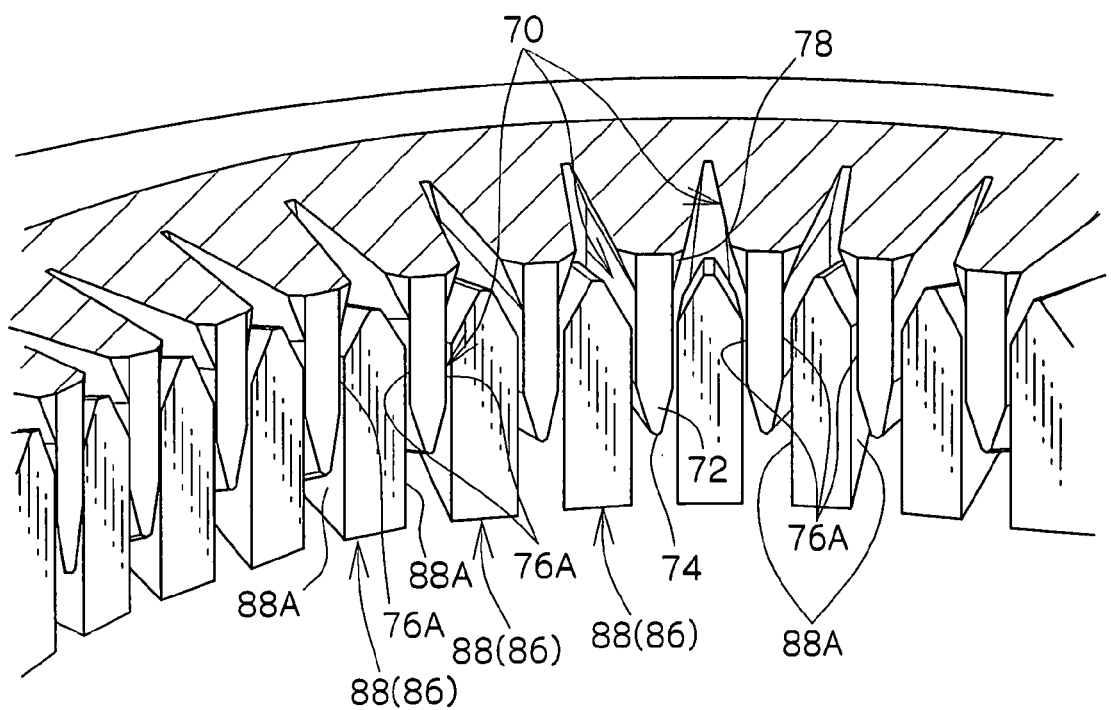
FIG. 9 is a perspective view showing the state in which the reel gear, which structures the recording tape cartridge according to the embodiment of the present invention, is meshed together with the driving gear of the drive device.

In this way, each tooth 70 is formed so as to have symmetry with respect to the central line in the transverse direction of the tooth. Teeth grooves (troughs) 79 formed between adjacent teeth 70 are formed in configurations resembling the teeth 70 (peaks). Further, at each tooth 70, the tooth distal portion 72 is formed to be larger than the root portion 78. As shown in FIGS. 8 and 9, when teeth 88 of the driving gear 86, which are formed in configurations which are substantially similar to those of the teeth 70, enter into the teeth grooves 79 and mesh together appropriately, sufficient gaps are ensured between, on the one hand, the tooth distal portions 72 and the root portions 78, and, on the other hand, the teeth 88 (see FIG. 10). Namely, portions of the teeth 70 other than the engaging portions 76 thereof are reliably prevented from abutting the teeth 88. Therefore, the teeth 70 do not impede the abutment of the reference surface 50A and the positioning surface 92.

Meshing surfaces 76A, which are the both side surfaces, in the circumferential direction of the reel gear 42, of the meshing portion 76 of each tooth 70, are substantially parallel to the axial direction of the reel 28. Namely, at the reel hub 32, the reel gear 42 is formed integrally by resin molding as described above, and hardly any draft is set at the meshing surfaces 76A. In correspondence therewith, at the teeth 88 of the rotating shaft 80, meshing surfaces 88A which mesh with the meshing surfaces 76A are formed to be substantially parallel to the axis of the rotating shaft 80.

Figure 10:
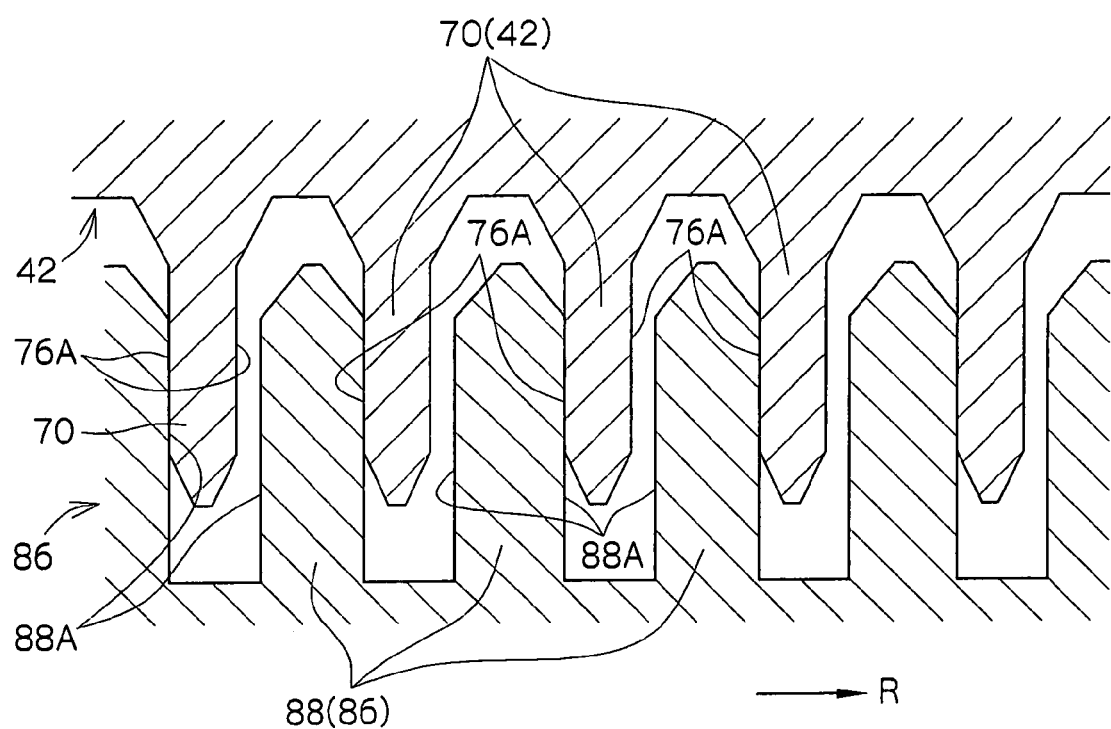
FIG. 10 is a schematic, enlarged sectional view of main portions, showing the state in which the reel gear, which structures the recording tape cartridge according to the embodiment of the present invention, is meshed together with the driving gear of the drive device.

Namely, as shown in FIG. 10, the meshing surfaces 76A, 88A are structured so as to be, in side view, substantially orthogonal to the rotating direction of the reel 28 which is denoted by arrow R.

In this way, as shown in FIGS. 8 through 10, when the reel gear 42 and the driving gear 86 rotate while the teeth 70, 88 mesh together at the meshing surfaces 76A and the meshing surfaces 88A, thrust (the component of force of the driving force of the rotating shaft 80, which component of force is applied in the axial direction) does not arise accompanying the rotation of the reel 28 around the axis thereof. Further, centering of the reel gear 42 with respect to the rotating shaft 80 is carried out by the configurations, the arrangement, and the number of the teeth 70 as the reel gear 42 meshes together with the driving gear 86.

In the present embodiment, the diameter of the reel hub 32 (the floor portion 36) is substantially 40 mm, and the reel gear 42 is provided in a vicinity of the outer periphery of the floor portion 36. This is to ensure the largest possible diameter of the reel gear 42 because, if the diameter of the reel gear 42 is small, high torque is required at the drive device which rotates and drives the reel 28, and the driving motor connected to the rotating shaft 80 is expensive.

Moreover, in the present embodiment, the arrangement and the size of the annular convex portion 50 and the reel gear 42 at the floor portion 36 are determined such that $r_1^2 > r_3^2 - r_2^2$, where $r_1$ is the inner radius of the reel gear 42, $r_2$ is the outer radius of the annular convex portion 50, and $r_3$ is the outer radius of the reel hub 32, as shown in FIG. 5. This shows that a larger reel plate 52 can be provided at the inner side of the reel gear 42 than at the outer side of the annular convex portion 50. Note that, when the reel plate 52, which is insert molded as described above, is provided so as to jut out from the radial direction outer side of the reel hub 32, the lower flange 38 is made thinner. Therefore, even if the reel plate 52 is disposed at the outer side of the annular convex portion 50, setting the outer radius of the reel plate 52 to be larger than $r_3$ is not considered.

In practice, the radius $r_1$ is not the actual inner radius of the reel gear 42, and the dimensions of the respective portions are determined in order to make the radius $r_1$ satisfy the above formula as the effective radius of the reel plate 52. Here, the effective radius of the reel plate 52 is a value equal to the square root of the quotient obtained by dividing the "effective surface area" by the circular constant ($\pi$), where the "effective surface area" is the surface area obtained by subtracting the surface areas of the through hole 52A and a buried portion 36A (see FIG. 5) for insert molding from the surface area of the range of the reel plate 52 which opposes and can be attracted by the magnet 96.

Next, operation of the present embodiment will be described.

At the recording tape cartridge 10 having the above-described structure, when the magnetic tape T is not in use, inadvertent rotation of the reel 28 is prevented by the braking member 54 which meshes with the engaging gear 44 of the reel 28, and the reel 28 is in a locked state. Further, the opening 18 is closed by the leader block 30.

On the other hand, when the magnetic tape T is to be used, the recording tape cartridge 10 is loaded into a bucket (not illustrated) of the drive device. When the recording tape cartridge 10 is loaded into the bucket, the bucket is lowered, and the rotating shaft 80 of the drive device relatively approaches the case 12 from below (relatively moves upward with respect to the case 12). Thus, the releasing/pushing portion 94 of the rotating shaft 80 presses the releasing projection 60 of the braking member 54, and pushes the braking member 54 upward against the urging force of the compression coil spring 66. In this way, the state in which rotation of the reel 28 is locked by the braking member 54 is released.

When the rotating shaft 80 moves further upward, the teeth 88 of the driving gear 86 enter in between the teeth 70 (into the teeth grooves 79) of the reel gear 42. When the positioning surface 92 of the rotating shaft 80 abuts the reference surface 50A of the reel 28, the rotating shaft 80 moves further upward together with the reel 28. Then, when the bucket is lowered by a set stroke and stops, movement of the rotating shaft 80 with respect to the case 12 stops. The reel 28 is positioned in the axial direction thereof at a position at which the reference surface 50A thereof abuts the positioning surface 92 and at which the reel 28 has risen up within the case 12 and can rotate. Further, due to the reel gear 42 meshing together with the driving gear 86, the reel 28 is centered with respect to the rotating shaft 80. In this state, the reel 28 is held at the rotating shaft 80 due to the attraction force by which the magnet 96 attracts the reel plate 52.

Due to the bucket being lowered, i.e., the recording tape cartridge 10 being lowered, within the drive device, the positioning pins of the drive device respectively enter into the positioning holes 24 and 26 of the case 12, and the positioning surfaces of the drive device abut the positioning surfaces 24A and 26A of the case 12. The case 12 is thereby positioned in the horizontal directions and in the vertical direction with respect to the drive device.

Thus, while a pull-out pin (not illustrated) of the pull-out device of the drive device engages with the engaging recess 30A of the leader block 30, the pull-out device pulls the leader block 30 out from the case 12 and guides the leader block 30 to the take-up reel of the drive device. The leader block 30 is fit into the take-up reel such that the arc-shaped surface 30B structures a portion of the take-up surface around which the magnetic tape T is taken-up. In this state, when the leader block 30 rotates integrally with the take-up reel, the magnetic tape T is pulled-out from the case 12 through the opening 18 while being taken-up onto the reel hub of the take-up reel.

At this time, the reel 28 of the recording tape cartridge 10 rotates synchronously with the take-up reel, due to the torque of the rotating shaft 80 which is transmitted by the driving gear 86 which meshes with the reel gear 42. Information is recorded onto the magnetic tape T or information recorded on the magnetic tape T is played back by a recording/playback (read/write) head disposed along a pre-determined tape path of the drive device.

On the other hand, when the magnetic tape T is rewound onto the reel 28 and the leader block 30 is held in a vicinity of the opening 18 of the case 12, the bucket in which the recording tape cartridge 10 is loaded is raised. Thus, the meshed-together state of the reel gear 42 and the driving gear 86 is cancelled, the abutment of the releasing projection 60 and the releasing/pushing portion 94 is cancelled, and the braking member 54 is returned, by the urging force of the compression coil spring 66, to the rotation locking position at which the braking gear 58 meshes with the engaging gear 44. Moreover, due to the urging force of the compression coil spring 66, the reel 28 also moves downward and returns to its initial state at which the reel gear 42 is exposed from the gear opening 20 while the lower flange 38 of the reel 28 abuts the annular rib 22. In this state, the recording tape cartridge 10 is ejected from the bucket.

Here, the reel 28 is positioned due to the reference surface 50A, which is the bottom end surface of the annular convex portion 50, abutting the positioning surface 92 of the rotating shaft 80. Therefore, an imaginary plane determined by the meshing-together of the reel gear 42 and the driving gear 86 is not the reference plane as in the conventional art. Thus, inspection and the like of the dimensions of the respective portions of the recording tape cartridge 10 as a unit can be carried out by using the reference surface 50A as a reference, and management of the dimensions of the respective portions is easy.

The annular convex portion 50, at which the reference surface 50A is formed, is formed in an annular form which is coaxial with the reel hub 32, and has a closed cross-section. Thus, the rigidity (mechanical strength) of the annular convex portion 50 is high. Therefore, it is difficult for the annular convex portion 50 to deform when forcibly abutting the positioning surface 92 of the rotating shaft 80, and the reliability of the accuracy of positioning by the reference surface 50A improves. In particular, at the reel hub 32 at which the annular convex portion 50 is formed integrally by resin molding, the reliability for use over a long period of time improves due to the rigidity of the annular convex portion 50 being high as described above. Moreover, the annular convex portion 50 connects the respective teeth 70 of the reel gear 42 at the radial direction outer ends of the teeth 70. Thus, the annular convex portion 50 is reinforced due to the teeth 70 of the reel gear 42 functioning as ribs. The rigidity of the annular convex portion 50 is even higher, and the reliability of the accuracy of positioning is improved even more.

In this way, in the recording tape cartridge 10 according to the present embodiment, axial direction positioning of the reel can be carried out reliably regardless of the meshing of the reel gear.

Here, the meshing surfaces 76A at the teeth 70 structuring the reel gear 42 are substantially parallel to the axial direction of the reel 28. Thus, thrust in the direction of moving the reel gear 42 and the driving gear 86 apart from one another at the time when the reel 28 is driven to rotate around the axis thereof, is prevented from being generated. Therefore, the reel 28 rotates stably while the state in which the reference surface 50A abuts the positioning surface 92 and the reel 28 is correctly positioned in the axial (vertical) direction is maintained. In this way, it is possible to prevent the magnetic tape T which is traveling from meandering. In addition, because the aforementioned thrust, i.e., a component of force of the driving force, is not generated, torque is efficiently transmitted from the rotating shaft 80 to the reel 28. Thus, the load on the driving motor at the drive device can be reduced, the amount of electricity consumed by the driving motor can be reduced, and the driving motor can be made to be more compact.

The tooth distal portion 72 of each tooth 70 structuring the reel gear 42 is formed in a taper shape at which the tooth tip 74 is the peak, so as to guide-in the teeth of the driving gear. Thus, even if the meshing surfaces 76A are substantially parallel to the axial direction of the reel 28 as described above, the reel gear 42 and the driving gear 86 reliably mesh together due to their relative movement in the axial direction. Moreover, because the top-to-bottom height of the meshing portion 76, at which hardly any draft is set at all, is relatively small, the resin moldability is prevented from deteriorating.

Because the number of teeth of the reel gear 42 is set to be 60 which is a number greater than or equal to 45, as compared with a structure in which the number of teeth is less than 45 (e.g., a structure in which there are about 8 teeth as in the case of a two-reel video tape), the amount of rotation of the reel 28 accompanying the elimination of phase offset at the time when the reel gear 42 and the driving gear 86 mesh together is small. In this way, winding slack in the magnetic tape T, which arises accompanying the rotation of the reel 28 at the time of this meshing, is suppressed. In a drive device in which torque cannot be managed at the time when the magnetic tape T is pulled-out, it is possible to pull the magnetic tape T out appropriately.

Moreover, because there is a large number of teeth at the reel gear 42, the backlash between the teeth 70 and the teeth 88 can be made to be small as compared with a structure in which there is a small number of teeth. In this way, the ability to center the reel 28 (the centering function) accompanying the meshing together of the reel gear 42 and the driving gear 86 is good as compared with a structure having a small number of teeth. In addition, because there is a large number of teeth at the reel gear 42, the torque transmitted from the driving gear 86 can be dispersed at the respective teeth 70, and each tooth 70 can be made to be small. Namely, the height of each tooth 70 from the tooth bottom (the bottom end surface of the floor portion 36 of the reel hub 32) to the tooth tip 74 is small. In this way, the stroke of relative movement needed for the reel gear 42 and the driving gear 86 to mesh together (the amount of lowering of the bucket), can be made to be small, and the drive device can be made to be more compact.

Note that the above-described embodiment is a preferable structure in which the reference surface 50A, which is the end surface of the annular convex portion 50, is a flat surface which is orthogonal to the axis of the reel 28. However, the present invention is not limited to the same, and the structure according to the modified example shown in FIGS. 11 and 12 may be used for example.

Figure 11:
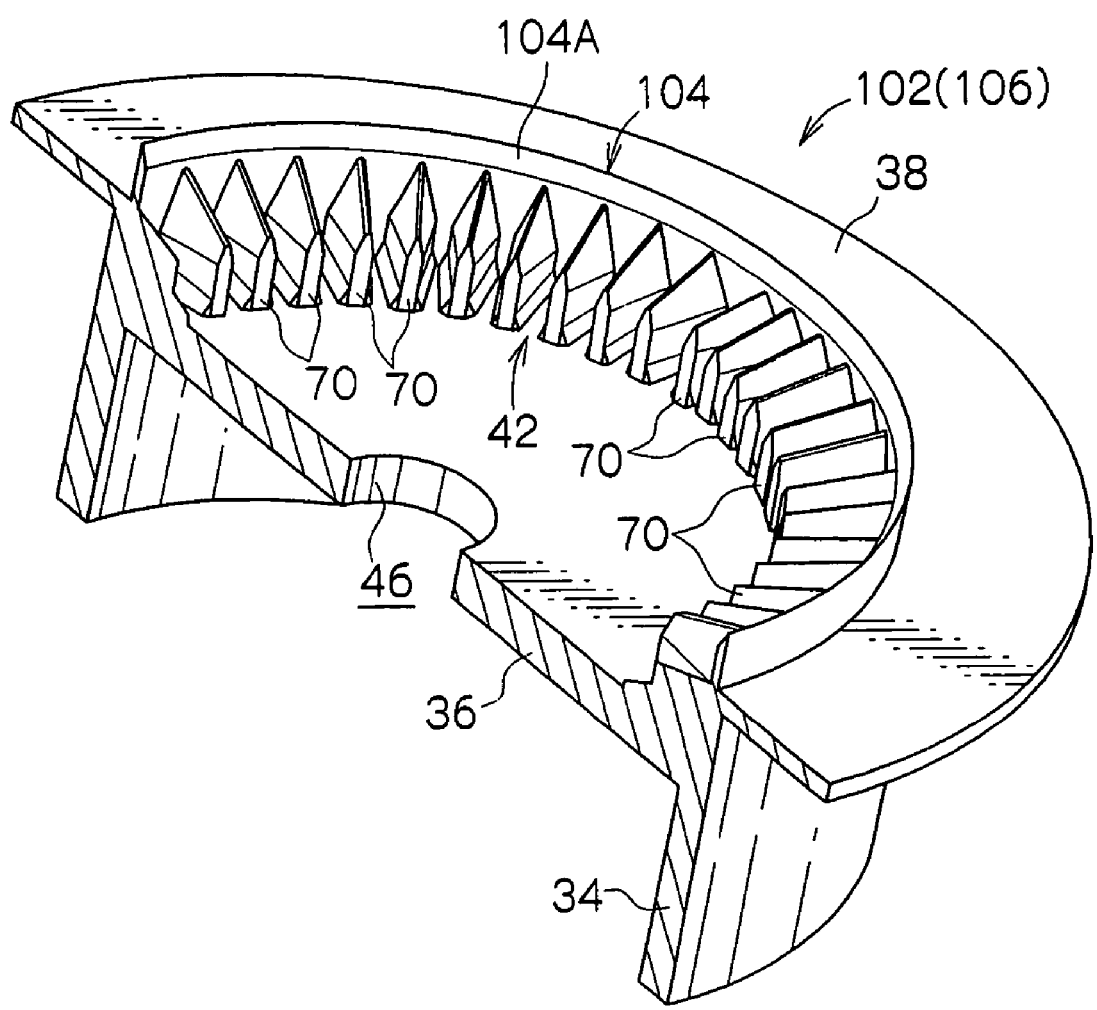
FIG. 11 is a perspective view corresponding to FIG. 4 and showing a modified example of a reference surface which structures the recording tape cartridge according to the embodiment of the present invention.
Figure 12:
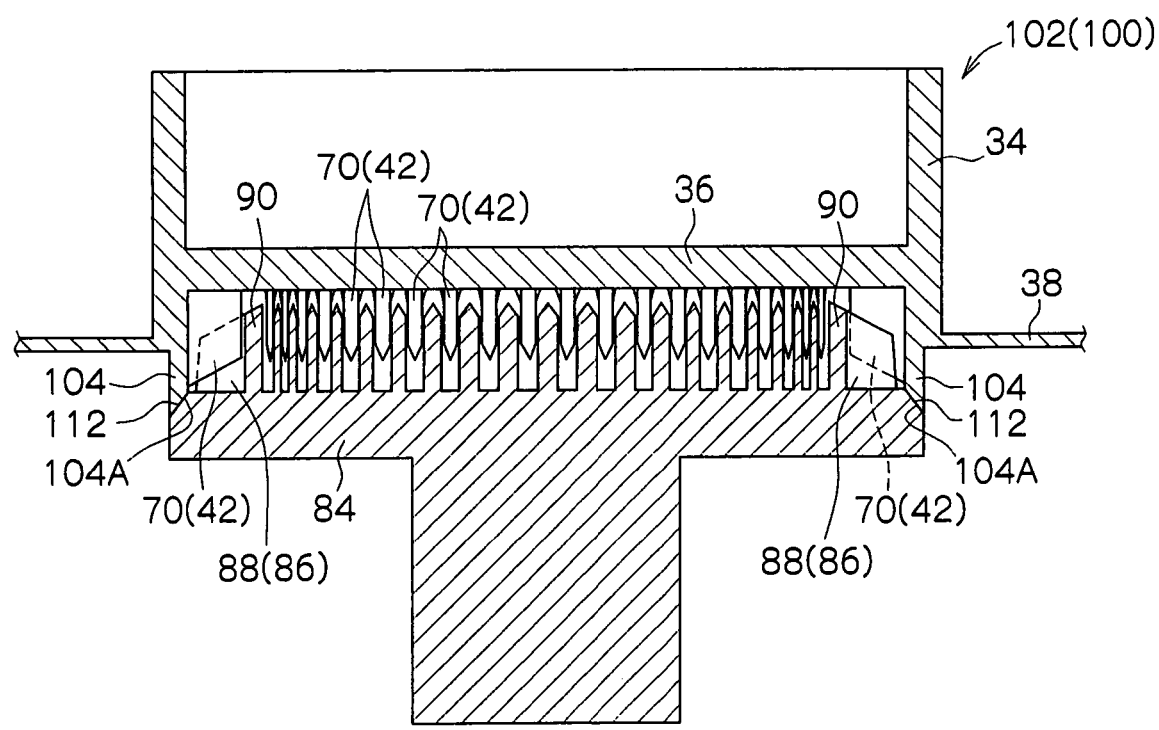
FIG. 12 is a sectional view corresponding to FIG. 8 and showing the modified example of the reference surface which structures the recording tape cartridge according to the embodiment of the present invention.
Figure 13:
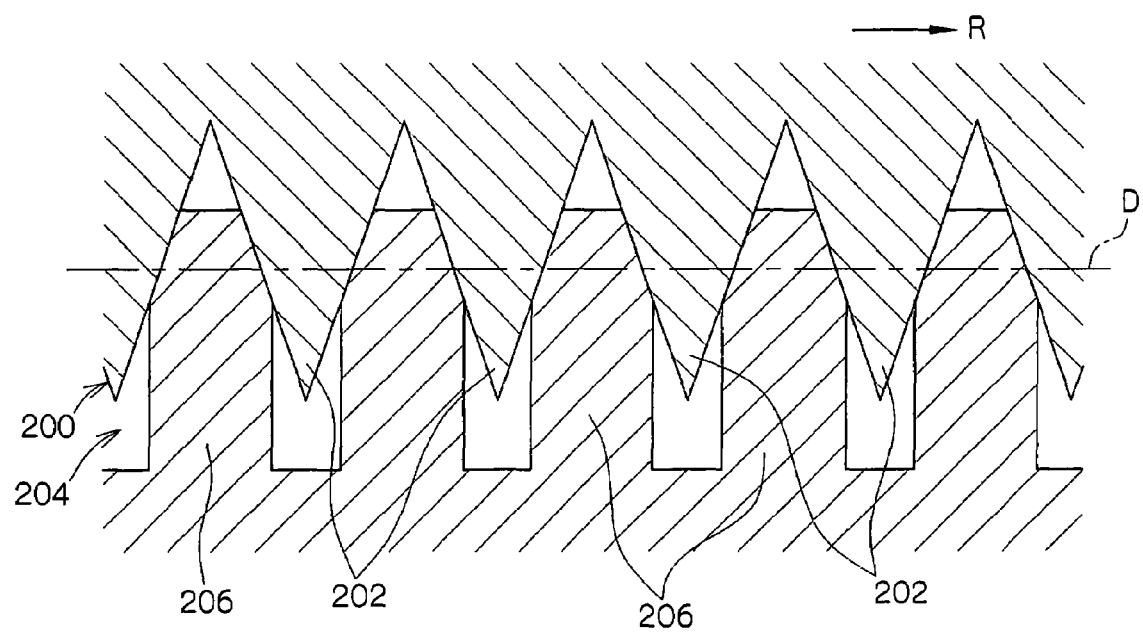
FIG. 13 is a schematic sectional view showing a meshed state of a conventional reel gear and driving gear.

A reel hub 102 of a reel 100 illustrated in FIG. 11 differs from the reel hub 32 of the reel 28 with regard to the point that the reel hub 102 has an annular convex portion 104 instead of the annular convex portion 50. The bottom end surface of the annular convex portion 104 is a taper surface (conical surface) at which the radial direction outer side portion projects further downward than the radial direction inner side portion. The bottom end surface of the annular convex portion 104 is a reference surface 104A. In the same way as the annular convex portion 50, the annular convex portion 104 connects the radial direction outer end portions of the respective teeth 70 which structure the reel gear 42. On the other hand, a rotating shaft 110 differs from the rotating shaft 80 with respect to the point that the outer peripheral portion of the top surface of the rotating table 84 is a positioning surface 112 which is a taper surface corresponding to the reference surface 104A. As shown in FIG. 12, positioning of the reel 100 in the axial direction is carried out by the reference surface 104A abutting the positioning surface 112.

Also in accordance with the recording tape cartridge 10 having the reel 100 according to the present modified example, the exact same effects as those of the above-described embodiment can be obtained. Further, in the structure according to the present modified example, the reference surface 104A and the positioning surface 112, which are taper surfaces which correspond to one another, abut one another while fitting together with one another. Therefore, the reel 100 is reliably centered with respect to the rotating shaft 110. Namely, the reference surface 104A which abuts the positioning surface 112 positions the reel 100 not only in the axial direction (the vertical direction), but also in the direction orthogonal to the axis (the horizontal direction), so as to support the centering function which accompanies the meshing-together of the reel gear 42 and the driving gear 86. Note that the reference surface 104A and the positioning surface 112 may be formed as taper surfaces which are such that the reference surface 104A is fitting in the positioning surface 112.

The above-described embodiment and modified examples are preferable structures in which the annular convex portions 50, 104 connect the outer end portions of the respective teeth 70 of the reel gear 42. However, the present invention is not limited to the same. For example, the annular convex portion 50 and the like may connect the inner end portions of the respective teeth 70, or the annular convex portion 50 may be provided independently of the reel gear 42.

Further, the above-described embodiment and modified examples are preferable structures in which the teeth 70 have the meshing portions 76 which are substantially parallel to the axis of the reel 28, and have the tooth distal portions 72 which are tapered and guide-in the teeth 88. However, the present invention is not limited by the above-described preferable configuration of the teeth 70, and it suffices for the reel gear 42 and the driving gear 86 to be able to mesh together (i.e., for settings to be carried out such that backlash arises between the reel gear 42 and the driving gear 86 in the correct meshed-together state) such that the reference surface 50A, 104A abuts the positioning surface 92, 112 and the position of the reel 28, 100 in the axial direction is determined. Moreover, the present invention is not limited to the preferable structure in which there are 60 of the teeth 70. However, the number of the teeth 70 is preferably 45 or more.

In addition, the above-described embodiment and modified examples are preferable structures in which the reel gear 42 is provided in a vicinity of the outer periphery of the reel hub 32. However, it suffices for the reel gear 42 to be able to mesh together with the driving gear 86 due to relative movement of the reel gear 42 and the rotating shaft 80, 110 in the axial direction, and the present invention is not limited by the size (the internal and external diameters) or the placement of the reel gear 42. Accordingly, for example, a structure is possible in which the reel plate 52 is disposed at the radial direction outer side of the reel gear 42 (the magnet 96 is disposed at the radial direction outer side of the driving gear 86).

The above-described embodiment and respective modified examples describe, as examples, structures in which rotation of the reel 28, 100 which is not in use is locked by the braking member 54. However, the present invention is not limited by the absence/presence of or the structure of the rotation locking mechanism of the reel 28 and the like. Accordingly, for example, a structure may be used in which a releasing member for releasing locking is provided between the braking member 54 and the floor portion 36. Or, a locking mechanism which locks rotation of the reel 28 and the like by engaging with the lower flange 38 may be provided.

Further, the above embodiment and respective modified examples describe, as examples, structures in which the recording tape cartridge 10 has the leader block 30. However, the present invention is not limited by the configuration of the case 12, the structure for pulling-out the magnetic tape T (the structure of the leader member), the structure for opening and closing the opening 18, and the like. Accordingly, for example, the recording tape cartridge 10 may be structured such that a small, solid cylindrical leader pin is attached as a leader member to the distal end of the magnetic tape T, or the recording tape cartridge 10 may be structured so as to have a shielding member which opens and closes the opening 18 (a sliding door which moves along a predetermined straight line or arc, or the like).

Further, the magnetic tape T is used as the recording tape in the above-described embodiment and modified examples. However, the present invention is not limited to the same. It suffices for the recording tape to be interpreted as an information recording/playback (read/write) medium which is shaped as an elongated tape and on which information can be recorded and from which recorded information can be played back. It goes without saying that the recording tape cartridge according to the present invention can be applied to recording tapes of any recording/playback systems.

Note that, in the recording tape cartridge of the present invention, it is preferable that the annular convex portion connect the respective teeth forming the reel gear, at either the radial direction inner end or outer end of the reel gear.

In this recording tape cartridge, the annular convex portion, which projects coaxially in an annular form from the end surface of the hub, connects, at the radial direction inner end or outer end of the reel gear, the respective teeth of the reel gear which is provided coaxially in an annular form at the end surface of the hub. Therefore, the annular convex portion is reinforced by the respective teeth of the reel gear, and the rigidity thereof is improved even more.

Further, in the recording tape cartridge of the present invention, it is preferable that, at the respective teeth structuring the reel gear, the meshing surfaces to which driving force is transmitted from the driving gear are formed so as to be substantially parallel to the axis of the reel.

In this recording tape cartridge, the surfaces, which mesh together with the driving gear (surfaces of driving force transmission), at the respective teeth structuring the reel gear are substantially parallel to the axial direction of the reel. Therefore, when the reel is driven to rotate around its axis, thrust (a component of force of the driving force) in the direction of making the reel gear and the driving gear move apart from one another is not applied. Thus, the reel rotates stably while the state in which the reference surface abuts the positioning portion and the reel is accurately positioned in the axial direction, is maintained. In this way, for example, meandering is prevented from arising in the recording tape which is traveling.

Moreover, in the recording tape cartridge of the present invention, it is preferable that the teeth distal portions of the respective teeth structuring the reel gear are formed in taper shapes which guide-in the teeth of the driving gear.

In this recording tape cartridge, the teeth distal portions of the respective teeth which structure the reel gear are formed in taper shapes which guide-in the teeth of the driving gear. Therefore, even if the aforementioned meshing surfaces are parallel to the axial direction of the reel, the reel gear and the driving gear reliably mesh together due to relative movement thereof in the axial direction.

What is claimed is:

1. A recording tape cartridge comprising:
a reel having a hub around whose outer peripheral portion a recording tape is wound, the reel being accommodated within a case;
a reel gear formed in an annular form which is coaxial with the reel, and provided at an end surface of the hub, and able to mesh with a driving gear of a drive; and
a pull-out portion which is formed in the case and has an opening for pulling-out the recording tape,
wherein an annular convex portion projects coaxially with the hub at the end surface of the hub, and an end surface of the annular convex portion is a reference surface which abuts a positioning portion of the drive device and carries out positioning of the reel in an axial direction of the reel, and when the recording tape is in use, the reel rotates around an axis due to driving force of the driving gear which meshes with the reel gear, in a state in which the reel is positioned in the axial direction of the reel and is raised up within the case.

2. The recording tape cartridge of claim 1, wherein the reel gear is structured from a plurality of teeth, and the annular convex portion connects the respective teeth of the plurality of teeth at a radial direction inner end of the reel gear.

3. The recording tape cartridge of claim 1, wherein the reel gear is structured from a plurality of teeth, and the annular convex portion connects the respective teeth of the plurality of teeth at a radial direction outer end of the reel gear.

4. The recording tape cartridge of claim 1, wherein the reel gear is structured from a plurality of teeth, and at each tooth of the plurality of teeth, meshing surfaces, to which the driving force is transmitted from the driving gear, are formed to be substantially parallel to the axis of the reel.

5. The recording tape cartridge of claim 4, wherein teeth distal portions of respective teeth of the plurality of teeth are formed in taper shapes which guide-in teeth of the driving gear.

6. The recording tape cartridge of claim 1, wherein the reel gear is structured from a plurality of teeth, and the plurality of teeth are 45 or more teeth.

7. The recording tape cartridge of claim 1, wherein the reel gear is provided in a vicinity of an outer periphery at the end surface of the hub.

8. The recording tape cartridge of claim 1, wherein the recording tape cartridge satisfies a formula $r_1^2 > r_3^2 - r_2^2$, where $r_1$ is an inner radius of the reel gear, $r_2$ is an outer radius of the annular convex portion, and $r_3$ is an outer radius of the hub.

9. The recording tape cartridge of claim 1, wherein a reel plate which is formed of a magnetic material is provided coaxially and integrally with the hub, at the end surface of the hub.

10. The recording tape cartridge of claim 9, wherein the reel plate is provided at an inner side of the reel gear.

11. The recording tape cartridge of claim 1, wherein the annular convex portion is formed integrally with the hub by resin molding.

12. The recording tape cartridge of claim 1, wherein the reference surface is a flat surface which is orthogonal to the axis of the reel, and the positioning portion is a flat surface which is orthogonal to an axis of the rotating shaft.

13. The recording tape cartridge of claim 1, wherein the reference surface is a taper surface which is inclined such that, at a bottom end surface of the annular convex portion, a radial direction outer side portion projects further downward than a radial direction inner side portion, and the positioning portion is a taper surface which corresponds to the reference surface.

14. The recording tape cartridge of claim 1, further comprising a leader block attached to a distal end of the recording tape, the leader block being pulled-out by a pull-out device of the drive device, and being able to close the opening.

15. The recording tape cartridge of claim 1, wherein the annular convex portion is a closed cross section in a shape of a hollow cylinder.

16. A recording tape cartridge comprising:

a reel having a hub around whose outer peripheral portion a recording tape is wound, the reel being accommodated within a case;

a reel gear formed in an annular form which is coaxial with the reel, and provided at an end surface of the hub, and able to mesh with a driving gear of a drive device; and a braking member capable of impeding rotation of the reel with respect to the case, wherein an annular convex portion projects coaxially with the hub at the end surface of the hub, and an end surface of the annular convex portion is a reference surface which abuts a positioning portion of the drive device and carries out positioning of the reel in an axial direction of the reel, and when the recording tape is in use, the reel rotates around an axis due to driving force of the driving gear which meshes with the reel gear, in a state in which the reel is positioned in the axial direction of the reel and is raised up within the case.

17. The recording tape cartridge of claim 16, wherein the braking member has a first engaging portion, the reel has a second engaging portion, and when the recording tape cartridge is not in use, the first engaging portion and the second engaging portion are engageable.

18. The recording tape cartridge of claim 17, wherein the first engaging portion and the second engaging portion are gears.

19. The recording tape cartridge of claim 16, further comprising a guide portion which holds the braking member such that the braking member cannot rotate with respect to the case, and which slidingly guides the braking member in vertical directions.

20. The recording tape cartridge of claim 19, wherein the braking member has a releasing projection which is pushed by a releasing/pushing portion of the drive device, and when the releasing projection is pushed, the braking member is pushed upward, and the reel becomes able to rotate with respect to the case.

21. The recording tape cartridge of claim 20, wherein the recording tape cartridge has, between the braking member and a ceiling plate of the case, a compression spring member which urges the braking member and the reel downward.

22. The recording tape cartridge of claim 16, wherein the annular convex portion is a closed cross section in a shape of a hollow cylinder.

* * * * *